Patented July 5, 1938

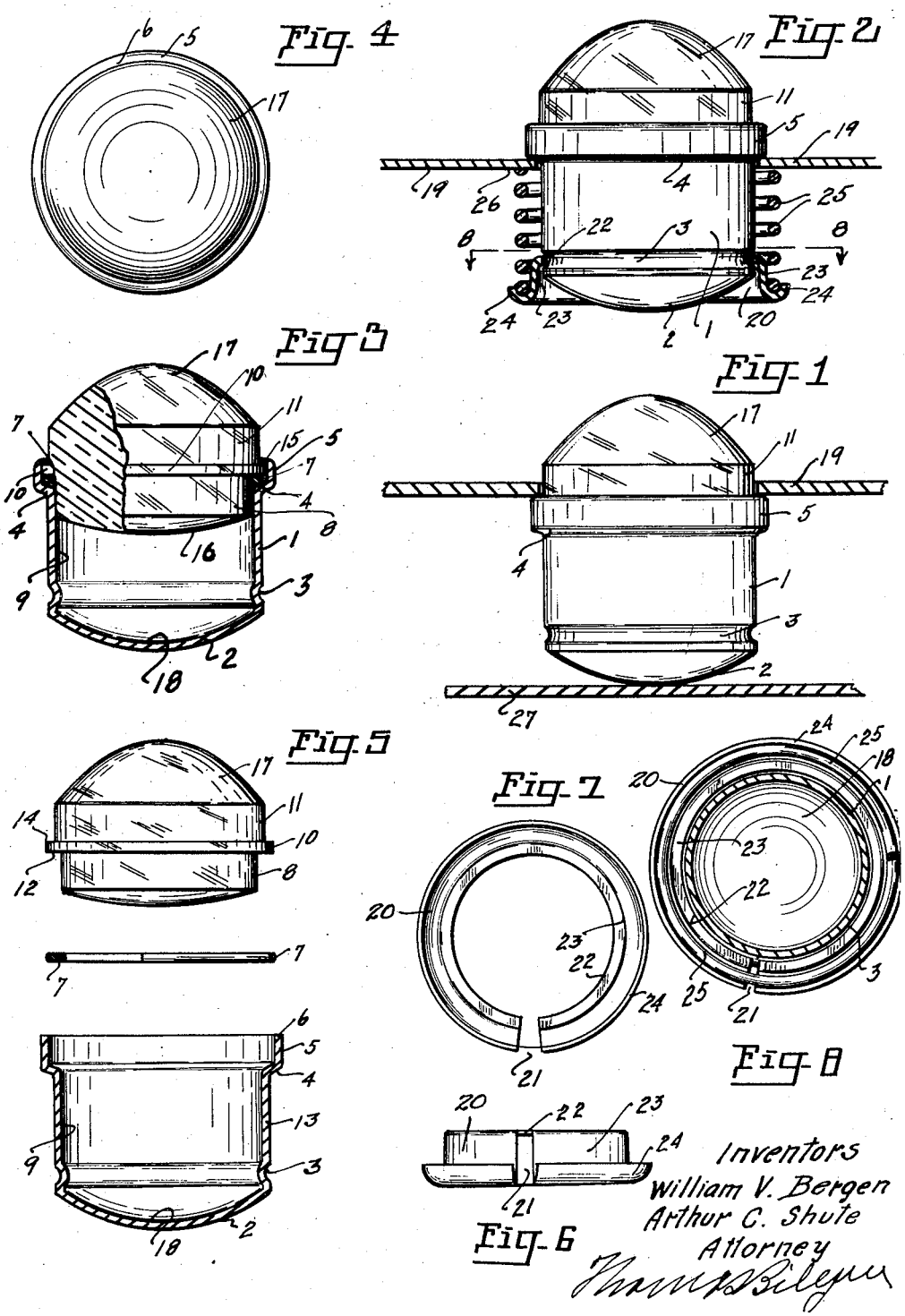

2,122,395

UNITED STATES PATENT OFFICE 2,122,395

LIGHT REFLECTOR ADAPTED FOR DUAL MOUNTING

William V. Bergen and Arthur C. Shute, Portland, Oreg., assignors to Niterday Signal Co., Portland, Oreg., a corporation of Oregon Application September 13, 1933, Serial No. 689,259

10 Claims. (Cl. 88—82)

Heretofore reflecting units of the smaller type have been maintained in holders in which the reflecting unit has been inserted either through the front or the back of the holder plate. In some instances, the States, municipalities and corporations using the same have preferred that the same be inserted from the back of the plate and be sealed therein by a second plate.

The primary purpose and object of our present invention consists in providing a reflecting unit that may be inserted in the holding plate with equal facility from the front or from the back of the plate.

Our invention comprises primarily a shell having a lens hermetically sealed therein. The lens is curved outwardly upon its front face and upon its rear face to produce a lens of greatest thickness along its axial center line. A ledge extends outwardly between the faces of the lens to facilitate its being hermetically sealed within the shell. The diameter of the lens is greater on its forward end than it is at the base end, the difference in diameter being equal to twice the thickness of the wall of the shell to thereby produce an assembled unit that may be placed within the hole in the plate from the front or from the rear of the plate and to form a precise fit between the outside diameter of the forward end of the lens when placed within the receiving hole from the rear, or to form a precise fit between the holding plate and the wall of the shell when inserted from the front. An annular recess is impressed within the shell adjacent its base end to provide means for securing the assembly in place within the supporting plate when the same is inserted from the front. A split collar is provided for admission into the annular recess and a reacting element as a coil spring is placed about the shell and acts as a retainer for maintaining the split collar in position within the annular recess and for holding the shell in place within the plate.

Heretofore it has been the general custom to place a reflector within the shell in juxtaposition with the lens and at the focal point of the lens to thereby reflect light passing through the lens back toward its source from the surface of the reflector.

Where suitable non-corrodible metal is used we have found that if the inner surface of the shell is polished at its base end the reflector may be dispensed with and the reflection be secured directly from the base of the shell itself. This lessens the difficulty of manufacture and produces a satisfactory reflector.

The object of our invention consists in providing reflecting units that are made of a minimum number of parts and that may be efficiently and cheaply made and that will have a long and useful life.

A further object of our invention consists in so constructing reflector units that they may be inserted within holding plates from the front or from the rear with equal facility.

A still further object of our invention consists in so constructing a lens that it may be hermetically sealed within the shell with greater facility and which will lend itself to more accurate production of a reflecting unit and with less breakage than has heretofore been possible.

And a still further object of our present invention consists in so constructing a locking means that it may be quickly applied and which will prevent the removal of the reflecting unit from the front of the plate without the destruction of the unit itself.

And a still further object of our invention consists in so constructing and assembling the device that it will have a wide angle of reflection.

With these and incidental objects in view, the invention consists in certain novel features of construction and combination of parts, the essential elements of which are set forth in the appended claims, and a preferred form of embodiment of which is hereinafter described with reference to the drawing which accompanies and forms a part of this specification.

In the drawing:

Fig. 1 is a side view of our new and improved device shown in place within a holder plate and illustrated as having been inserted from the rear of the holder plate.

Fig. 2 is a side view of one of our new and improved devices shown in place within a holder plate and shown as having been inserted from the front of the holder plate. In this view we have shown our new and improved locking device in cross section.

Fig. 3 is a sectional side view of one of our new and improved shells and a partial sectional side view of the lens shown in place.

Fig. 4 is a plan view of the lens illustrated in Fig. 3.

Fig. 5 is a sectional side view of the shell, a fragmentary sectional side view of the gasket and a side view of the lens, each shown in juxtaposition with the other and illustrating the lens as being in position for being inserted within the open end of the shell and in advance of the same having been hermetically sealed therein.

Fig. 6 is a side view of the split locking ring.
Fig. 7 is a plan view of the split locking ring.
Fig. 8 is a sectional plan view of the mechanism illustrated in Fig. 2. This view is taken on line 8—8 of Fig. 2, looking in the direction indicated.

Like reference characters refer to like parts throughout the several views.

Our present device comprises a shell made of a single piece of non-corrodible metal, or of a piece of corrodible metal that has been surface-treated to render the same non-corrodible. The shell 1 is made cylindrical between its base end and its lens receiving end. The base end 2 of the shell is curved outwardly. An annular recess 3 is formed in the side wall of the shell and immediately adjacent its base end. A gasket receiving shoulder 4 is formed within the shell, and at the time of the forming of the shell. The outer end 5 of the shell is annular and enlarged to a greater diameter than the uniform diameter from the shoulder 4 to the base of the shell. A suitable gasket 7 is provided to closely fit within the outer end of the shell and to rest directly upon the annular shoulder 4.

A relatively long lens is provided for suitable colored glass to meet the requirements for the position and place for which the reflecting unit is to be used. The base end 8 has a uniform diameter and the diameter is of a size to precisely fit that portion 9 of the shell that is immediately inside of the shoulder 4. An annular ledge 10 extends outwardly from the diameter 11 of the lens. The diameter of the ledge portion 10 is the same as the inside diameter of the outer portion 5 of the shell and is made to precisely fit the same. The underside 12 of the ledge is made to rest directly upon the gasket 7. The outer portion 11 of the lens is of the same diameter as the base portion 13 of the shell.

In placing the lens within the shell the top 6 of the shell is spun or pressed over the top portion 14 of the ledge and compresses the lens upon the gasket and thereby hermetically seals that end of the shell. The top 6 of the shell is made to rest directly upon the top portion 14 of the ledge and to precisely engage the lens itself as illustrated at 15 in Fig. 3.

Each of the faces 16 and 17 of the lens is curved outwardly and the face 16 is placed in juxtaposition with the inner polished surface 18 of the shell. The spacing of the lens from the reflecting portion of the shell is so adjusted that the focal point of the lens is on the reflecting surface. It will also increase the reflecting value of the reflector if the entire interior of the shell is also polished.

A relatively wide angle of reflection is produced by the proper placing and curving of the reflecting base portion of the shell.

Some of the users of devices of this kind prefer that the reflecting unit be inserted from the front through an opening hole in the plate 19. Other users of the same prefer that the reflecting unit be inserted in the hole of the plate from the rear.

It is necessary in either installation that the reflecting unit be made secure against removal by vandals. Since a large proportion of the users of devices of this kind are so divided in opinion that it becomes necessary to insert the same either from the front or from the rear, we have provided a reflecting unit that may be used with equal facility for front or rear insertion within the holder plate.

Where the unit is to be inserted in the holder plate from the front, we provide an annular ring 20. The ring is split as illustrated at 21 to facilitate the same being placed over the shell and the inner lip 22 of the same is permitted to engage within the annular recess 3 of the shell. This split ring has relatively straight side walls 23 that are disposed between the inner lip 22 and the outer lip 24. The split ring is made of a diameter so that the normal tension within the same places the lip 22 in intimate engagement with the shell at the annular recess.

A helical spring 25 is provided of a suitable length to engage upon the underside 26 of the holder plate 19 upon its one end and the oppositely disposed end of the helical spring is made to engage within the split ring and to normally close the gap 21 of the split ring.

Where the reflecting units are to be placed within the holder plate from the rear, the installation is made as illustrated in Fig. 1 and when so arranged a closure plate 27 is provided for maintaining the reflecting units in place within the holder thereof.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What we claim is:

1. In a device of the class described, the combination of a one piece shell made of non-corrodible metal, the base of the shell being outwardly curved, an annular ring formed within the shell adjacent the base of the shell and inwardly extending, a shoulder formed adjacent the lens receiving end of the shell, a gasket disposed upon the shoulder of the shell, a lens the opposite ends of which are curved outwardly, an annular ledge disposed upon the outer cylindrical surface of the lens and between its curved ends, the diameter of the lens below the ledge smaller than the diameter of the lens above the annular ledge, the open end of the shell being reamed over the ledge to hermetically seal the lens relative to the shell, the inner end of the lens being placed in juxtaposition to the inner surface of the base of the shell, and the spacing being sufficient to place the inner surface of the shell at the focal point of the lens, a split ring having lips inwardly and outwardly extending at its top and bottom sides respectively, the inner lip being adapted for engagement within the annular ring of the shell, a coil spring and the base of the coil spring being adapted for engagement within the outer lip of the split ring.

2. In a device of the class described, the combination of a one piece shell, the base end of the shell being rounded, a reflecting surface disposed upon the concave side of the shell base, a shoulder disposed upon the inner surface of the shell and spaced apart from the open end of the shell, a lens, each end of which is convex, the base end of the lens being of a diameter sufficient to precisely fit the inner surface of the shell below the shoulder of the shell, an annular ledge disposed about the mid section of the lens, the ledge being adapted for resting upon a gasket mounted upon the shoulder of the shell, the shell being pressed over upon the annular ledge of the lens to hermetically seal the same, the diameter of the lens above the annular ledge being equal to the outside diameter of the shell below the shoulder and the reflecting surface of the shell being placed at the focal point of the lens.

3. In a device of the class described, the combination of a shell having a base which is concave as viewed from the open end of the shell, the shell having a uniform diameter between its ends and the shell having a maximum diameter at its lens receiving end, a lens hermetically sealed within the shell, the lens being convex at its ends and the inner end of the lens being so placed that the concave surface of the shell is at the focal point of the lens, a portion of the lens extending outwardly from the open end of the shell, said outwardly extending portion of the lens having a diameter equal to the outside diameter of the shell between its ends.

4. A new article of manufacture comprising a shell and a lens in said shell hermetically sealed relative thereto, the longitudinal axis of the shell and of the lens being coincident, the lens having an integral annular ledge formed therearound, the outside diameter of the shell for the greater portion of its length and the diameter of the lens outside of the confines of the shell being uniform and the same, the hermetic seal comprising a seat disposed in the shell, a gasket placed thereupon, said integral ledge of the lens being pressed against the gasket by a spun rim terminating the shell.

5. A new article of manufacture comprising a lens and shell, a shoulder formed in the shell and extending outwardly from the base portion thereof, one end of the lens extending from the shouldered end of the shell and having a diameter equal to the outside diameter of the base portion of the shell, a flange formed on the lens and being of greater diameter than that of the portion of the shell below the shoulder, said flange on the lens being hermetically sealed against said shoulder of the shell, and said shoulder forming a limit stop for movement of the lens and shell through a receiving hole in a single supporting plate.

6. A light reflecting device comprising a shell of single thickness, a lens having a flange for engagement with a shoulder formed in the shell, the diameter of the shoulder being greater than that of the shell and lens, the flange being embraced by said shell and hermetically sealed with respect thereto, one end of the lens extending beyond the flange and the end of the shell, the extending portion of the lens having an outside diameter equal to the outside diameter of the shell, and light reflecting means disposed within the shell, and arranged at the focal distance from the lens.

7. A light reflecting device comprising a shell of single thickness, a lens having a flange for engagement with a shoulder formed in the shell, the diameter of the shoulder being greater than that of the shell and lens, the flange being embraced by said shell and hermetically sealed with respect thereto, one end of the lens extending beyond the flange and the end of the shell, the extending portion of the lens having an outside diameter equal to the outside diameter of the shell, and light reflecting means disposed within the shell, said light reflecting means comprising a mirror arranged at the focal distance from the lens.

8. A light reflecting device comprising a shell of single thickness, a lens having a flange for engagement with a shoulder formed in the shell, the diameter of the shoulder being greater than that of the shell and lens, the flange being embraced by said shell and hermetically sealed with respect thereto, one end of the lens extending beyond the flange and the end of the shell, the extending portion of the lens having an outside diameter equal to the outside diameter of the shell, and light reflecting means disposed within the shell, said light reflecting means comprising a polished portion of the interior of the shell arranged at the focal distance from the lens.

9. A new article of manufacture comprising a shouldered shell having a flanged lens hermetically sealed therein the flange of the lens seating against a gasket disposed upon said shouldered portion of the shell, the lens extending beyond the shell, and the outside diameter of the base end of the shell and the diameter of the lens beyond the confines of the shell being the same.

10. A new article of manufacture comprising a cylindrical shell closed at one of its ends by a concave end wall having a reflecting surface on its inside, the opposite end of said shell being formed into a shoulder of greater diameter than that of the shell, a flanged lens embraced by the shell and extending outwardly therefrom, the flange of the lens being fitted in the shouldered portion of the shell and seated on a gasket disposed on the shoulder, the reflecting surface within the shell being disposed at the focal point of the lens, the diameter of that portion of the lens extending beyond the shell being equal to the outside diameter of the shell.

WILLIAM V. BERGEN.
ARTHUR C. SHUTE.